United States Patent
Rajakarunanayake et al.

(10) Patent No.: US 7,773,546 B2
(45) Date of Patent: Aug. 10, 2010

(54) SYSTEM AND METHOD FOR A SOFTWARE-BASED TCP/IP OFFLOAD ENGINE FOR DIGITAL MEDIA RENDERERS

(75) Inventors: Yasantha Rajakarunanayake, San Ramon, CA (US); Lars Severin, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 439 days.

(21) Appl. No.: 11/717,326

(22) Filed: Mar. 13, 2007

(65) Prior Publication Data

US 2008/0117911 A1    May 22, 2008

Related U.S. Application Data

(60) Provisional application No. 60/860,292, filed on Nov. 21, 2006.

(51) Int. Cl.
*H04J 1/16* (2006.01)
*H04L 12/56* (2006.01)

(52) U.S. Cl. .................. 370/278; 370/252; 370/282

(58) Field of Classification Search ........... 370/389, 370/252, 278, 282
See application file for complete search history.

(56) References Cited

U.S. PATENT DOCUMENTS

| | | | |
|---|---|---|---|
| 5,872,777 A | | 2/1999 | Brailean et al. |
| 5,915,094 A | * | 6/1999 | Kouloheris et al. .......... 709/219 |
| 6,947,430 B2 | | 9/2005 | Bilic et al. |
| 6,965,941 B2 | | 11/2005 | Boucher et al. |
| 7,000,024 B1 | * | 2/2006 | Champagne et al. ........ 709/232 |
| 7,009,967 B1 | * | 3/2006 | Hariharasubrahmanian . 370/389 |
| 7,047,273 B2 | * | 5/2006 | Kamentsky et al. ......... 718/101 |
| 7,430,617 B2 | | 9/2008 | Walsh et al. |
| 2002/0095519 A1 | * | 7/2002 | Philbrick et al. ............ 709/250 |
| 2003/0145101 A1 | | 7/2003 | Mitchell et al. |
| 2004/0062245 A1 | | 4/2004 | Sharp et al. |
| 2005/0055720 A1 | * | 3/2005 | Atad et al. .................... 725/68 |
| 2006/0182025 A1 | * | 8/2006 | Kim et al. .................... 370/229 |
| 2008/0198781 A1 | | 8/2008 | Rajakarunanayake et al. |

* cited by examiner

*Primary Examiner*—John Pezzlo
(74) *Attorney, Agent, or Firm*—Brake Hughes Bellermann LLP

(57) ABSTRACT

A method of receiving data from a first computing device to a second computing device through a network is disclosed. The transfer adheres to a packet-based network protocol. A connection between the first and second computing devices is established according to the protocol. A data packet is received from the first device at the second device, where the data packet includes payload data and a header. A packet header template is defined for acknowledging receipt of the data packet, and the template has static fields filled with static values and variable fields that can acquire packet-dependent values. The header template is stored in a memory device of the second device. Packet-dependent values of the variable fields of the template are updated. An ACK packet that includes a copy of the updated packet header is sent from the first computing device to the second computing device to acknowledge the receipt of the packet.

20 Claims, 3 Drawing Sheets

SYSTEM AND METHOD FOR A SOFTWARE-BASED TCP/IP OFFLOAD ENGINE FOR DIGITAL MEDIA RENDERERS

CROSS-REFERENCE TO RELATED APPLICATION

This application claims priority under 35 U.S.C. §119 to provisional patent application 60/860,292, filed Nov. 21, 2006, titled "System and Method for a Software-Based TCP/IP Offload Engine for Digital Media Renderers," which is incorporated herein by reference in its entirety.

TECHNICAL FIELD

This description relates to the rendering of digital media data and, in particular, to a system and method for a software-based TCP/IP offload engine for digital media renderers.

BACKGROUND

As Internet based broadband systems have become widely deployed, the display of high-quality streaming media (e.g., television signals) delivered through Internet protocol ("IP") based networks has been contemplated. Many vendors seek both to display media as well as to stream digital media in various customer premises, including digitally connected homes. However, because of the high bandwidth and processing power required to deliver and display digital video, it is quite a challenge to provide high quality IP-based television ("IPTV") functionality using traditional settop box ("STB") capabilities.

Use of the Transmission Control Protocol/Internet Protocol ("TCP/IP") as a protocol for network digital media transmission and reception has been proposed and adopted for its strength in error-free reliable data delivery in digital streaming media applications. The ubiquity of TCP/IP, the ease of creating applications on top of TCP/IP, and the error-free nature of the TCP/IP communications are some of its advantages. However, disadvantages of using TCP/IP as a transfer protocol for digital media applications include the fact that the central processing unit ("CPU") load when using TCP/IP is quite high and often limits the application performance on low end IPTV settop boxes used for digital media streaming and rendering.

TCP/IP it is a heavyweight protocol in terms of its resource use and generally does not scale well for high bandwidth applications on low powered STBs. Normally, when TCP/IP is used to receive an audio-visual ("AV") data stream from a server through a network for playback on a client, a network interface on the client receives packetized data into kernel space buffers, the packets flow up to the TCP/IP layer, and then the packets are copied to application buffers. In addition, the TCP/IP stack creates acknowledgement packets and sends the acknowledgement packets out through the network interface to the server. When the successful transmission of a packet is acknowledged, the received payload data stored in the application buffers gets copied back to playback decoders, from which the payload data is consumed by the video- and audio-rendering hardware, and displayed on an output device.

The processing steps required to move TCP/IP data input through the network interface to the output device using a standard TCP/IP stack are expensive in terms of CPU processing. For example, within the IP layer, IP packet headers are validated, and header checksum analysis is performed in software. Within the TCP layer, received packets are acknowledged back to the server, packets are copied from the network interface to user space application buffers via sockets, a checksum is performed at the TCP layer, and flow control is maintained through various algorithms based on slow-start methods, congestion avoidance, and requests for retransmissions.

At various protocol layer transitions (e.g., Ethernet to IP or IP to TCP) the CPU must compute information for use in packet headers. Often data is moved from one memory location to another for access by hardware. If cached memory access is used to speed up computations, the data caches must be written back to main memory because the CPU will make the cached data lines dirty, which degrades the CPU's performance. In addition, modern protocol stacks process packets with socket buffers, which provide a flexible implementation and general purpose data structure for passing data around internally in operating system kernels. However, the socket buffer allocation, tracking, and freeing (when transmissions are completed) can consume significant CPU resources as well.

Thus, the TCP/IP protocol stack generally uses significant CPU and memory resources, and low end STBs are usually unable to sustain high bandwidth reception (e.g., 20-50 Mbits/sec) without a TCP offload facility ("TOE"). While hardware acceleration of TCP has been applied in high performance servers, it adds an additional cost for STBs, and such a cost can be prohibitive.

SUMMARY

In a first general aspect, a method of receiving data transferred from a first computing device to a second computing device through a network is disclosed, where the transfer of data adhering to a packet-based network protocol. In the method, a connection between the first computing device and the second computing device for a session is established according to the network protocol. A data packet is received from the first computing device at the second computing device, where the data packet includes payload data and a header. A packet header template is defined for acknowledging the receipt of the data packet, and the template has a plurality of static fields filled with static values and variable fields that can acquire packet-dependent values. The header template is stored in a memory location of the second computing device, and the packet-dependent values of the variable fields of the template stored in the memory location in a memory device are updated. An ACK packet that includes a copy of the updated packet header is sent from the first computing device to the second computing device to acknowledge the receipt of the packet.

Implementations can include one or more of the following features. For example, the network can be a wireless network. The protocol can be TCP/IP, and a variable field can be adapted for carrying the value of a sequence number identifying the ACK packet within a sequence of a plurality of ACK packets sent from the first computing device to the second computing during the session. The protocol can be TCP/IP, and a variable field can be adapted for carrying the value of an acknowledgement number corresponding to the value of a sequence number of the received data packet. The protocol can be TCP/IP, and the static fields can include a source field, a destination field, and a window size field, and the variable fields can include a checksum field, and the method can further include performing a checksum analysis on the data packet and adding the result of the checksum analysis to the checksum field. The protocol can be TCP/IP, and the method can further include writing updated packet-dependent values from a CPU cache to the template stored in the memory, where at least one of the static values used in ACK packet is not written from the template to the CPU cache and back to the memory device. The payload data can be routed to a video display device.

In another general aspect, a method of receiving data transferred from a first computing device to a second computing device through a network is disclosed, where the transfer of data adhering to a TCP/IP protocol. A connection is established between the first computing device and the second computing device for a session according to the TCP/IP protocol. A data packet is received from the first computing device at the second computing device, where the data packet includes payload data and a header. A packet header template is defined for acknowledging the receipt of the data packet, and the template has a plurality of static fields filled with static values and variable fields that can acquire packet-dependent values. The header template is stored in a memory location. A sequence number value is assigned with a central processing unit of the second computing device to the sequence number field of the header template. An acknowledgement number value is assigned with the central processing unit to the acknowledgement number field of the header template. Then an ACK packet is sent that includes a copy of the packet header template, including the assigned acknowledgement and sequence numbers, from the second computing device to the first computing device to acknowledge the receipt of the packet.

Implementations can include one or more of the following features. For example, when the data packet can corresponds to an expected packet, the acknowledgment number value can be equal to a value of data packet's sequence number plus a length of the received data packet. When the data packet corresponds to an unexpected packet, the acknowledgment number value can be equal to the value of an acknowledgement number of an ACK packet that was previously-sent from the second computing device to the first computing device. The sequence number value can be equal to an acknowledgement number value of the received data packet. The network can be a wireless network. The first computing device can be a settop gateway, and the second computing device can be a settop client, and both computing devices are located within the same building.

In another general aspect, a playback computing-device is disclosed for receiving data transferred from a streaming computing through a network, where the transfer of data adheres to a TCP/IP protocol. The playback computing-device includes a central processing unit (CPU), a random access memory, a network interface device, and a memory for storing computer-executable instructions. When executed, the instructions cause the network interface device, to establish a connection with the playback computing device for a session according to the TCP/IP protocol. When executed, the instructions also cause the central processing unit to define a packet header template and to store the header template in the random access memory. The template has a plurality of static fields filled with static values and variable fields that can acquire packet-dependent values, and the variable fields include a sequence number field and an acknowledgement number. When executed, the instructions also cause the central processing unit to assign sequence number values to the sequence number fields of the header template for each of the plurality of packets and cause the central processing unit to assign acknowledgement number values to the acknowledgement number fields of the header template for each of the plurality of packets. When executed, the instructions also cause the network interface device to send ACK packets to the streaming computing device to acknowledge the receipt of data packets, where the ACK packets include a copy of the packet header template, including the assigned acknowledgement and sequence numbers.

Implementations can include one or more of the following features. For example, the network can be a wireless network. The streaming computing device can be a settop gateway and the playback computing device can be a settop client, and both computing devices can be located within the same building. The playback computing-device of claim also can include a buffer, and the memory can further include computer-executable instructions that, when executed, cause the playback computing device to store data packets received from the streaming computing device in the buffer, determine whether a received data packet is an expected data packet. When the received data packet is an expected data packet the playback computing device can send the ACK packet with an acknowledgment number value that is equal to a value of received data packet's sequence number plus a length of the received data packet. When the received data packet is not an expected data packet, the playback computing device can send an ACK packet having an acknowledgment number value that is equal to the value of an acknowledgement number value of an ACK packet that was previously-sent to the streaming computing device. The sequence number values of ACK packets can be equal to an acknowledgement number value of data packets received from the streaming computing device.

The playback computing-device of claim 14, wherein the central processing unit, the random access memory, the memory, and the network interface device are located within a system on a chip.

DETAILED DESCRIPTION

Thus, as described herein, a client-side Software-based TCP/IP Offload Engine ("cSTOE") can be used to provide reliable, error-free video/audio reception on a client device (e.g., a set top box) with very low CPU utilization. Through use of the cSTOE and the consequential reduction of CPU usage, inexpensive processors and hardware resources can be used in the client device, while still using TCP/IP to transfer the audio/visual stream, such that very efficient, error-free handling of multiple high-definition ("HD") video streams can be achieved with standard, inexpensive hardware resources.

Figure 1:
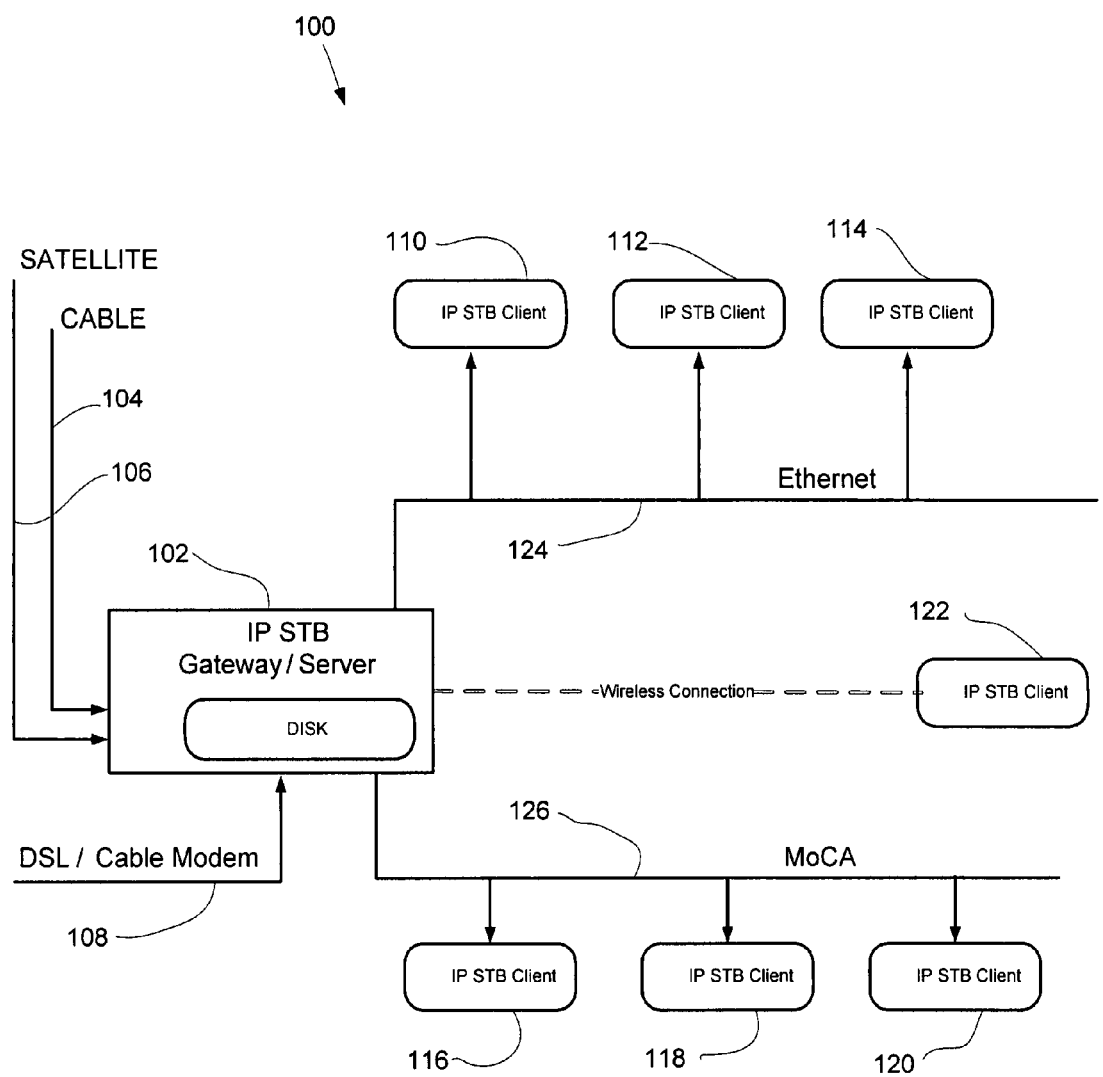
FIG. 1 is a block diagram of a client-server system for streaming digital media data from a server to a client.

FIG. 1 is a schematic diagram of a system in which media data (e.g., audio data, video data, audio-visual data, such as, television) is received from a network (e.g., a local area network ("LAN") or a wide area network ("WAN"), such as, for example, the Internet) by an IP settop box server/gateway 102. The network can be a wired or a wireless network, such as, for example, a digital cable network 104, a satellite network 106, and/or a DSL network 108. The received data can be in other transport forms, such as, for example, MPEG transport streams etc., as well as in different protocols, such as, for example, the UDP, RTP or TCP/IP protocol.

After reception of the data, the data can be stored on one or more memory devices 103 within the settop box server 102 for later distribution to client devices for playback. The memory device 103 can be, for example, a disk, RAM or flash memory. After being received and/or stored by the server/gateway 102, the media data can be routed to one or more STB clients 110, 112, 114, 116, 118, 120, and 122 though a LAN that can be either a wired or a wireless network. Thus, redistribution of digital media can occur from one STB (i.e., Gateway 102) to another STB (i.e., IPSTB clients 110-120) in a digitally-connected location. One or several storage media (e.g., disks) 128 may be resident in gateway/server 102, and the disks can act as repositories for further streaming. The TCP/IP based digital media distribution architecture can be used to make any content located anywhere in the premises available to any rendering device.

Wired networks can be, for example, an Ethernet network 124 (e.g., 100 BT full duplex Ethernet) or a Media over Cable Architecture (MoCA) network 126, which allows Ethernet-like packet transmission using in-home co-axial cable connections. The clients 110, 112, 114, 116, 118, 120, and 122 can include digital media renderers of various kinds, including digital settop boxes, which can output media data for rendering on a display device. The display device can be, for example, a television screen, a computer screen, a speaker, a handheld computing device (e.g., a smart phone or video game device) or any other audio or video display device.

Figure 2:
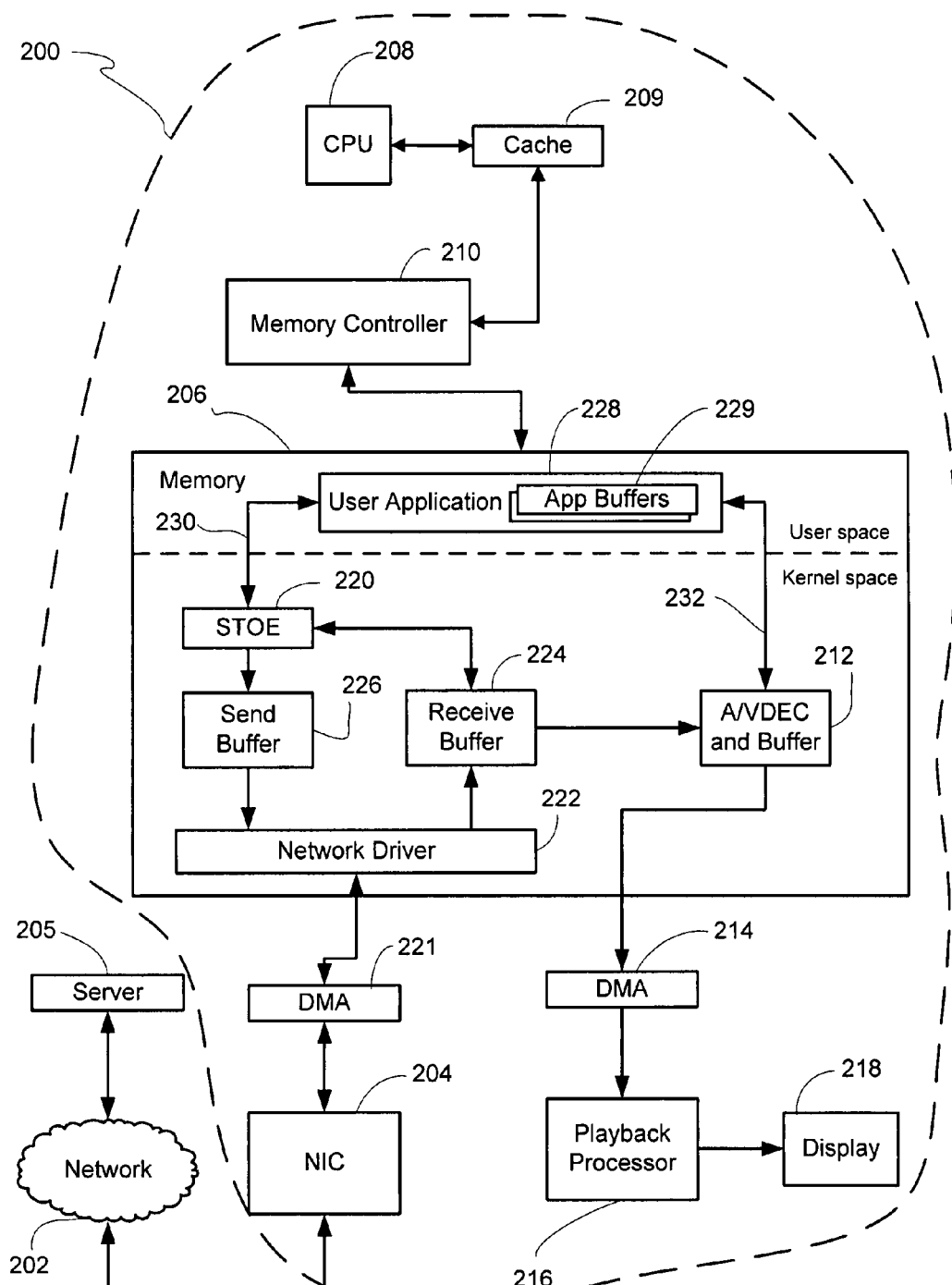
FIG. 2 is a block diagram of a system implementing a client-side software based TCP/IP offload engine.

FIG. 2 is a schematic diagram of a client system 200 for the delivery and playback of digital media data. As shown in FIG. 2, TCP/IP packets of media data can be received from a WAN or LAN network 202 through a network interface 204. The TCP/IP packets can be sent from a server 205. The network interface 204 can be a network interface controller (NIC), through which media data packets pass en route to a memory device 206 of the system. The system 200 includes a central processing unit 208 that performs operations on data and that, in conjunction with a memory controller 210, can copy data out of an into different locations in a main memory device 206 (e.g., random access memory ("RAM")).

The CPU 208 is operatively coupled to a local cache 209 that is generally a smaller, faster memory device that the main memory 206 and that stores copies of the data fetched from the main memory 206. The CPU 208 can perform operation on the cached data and then, once the operations have been performed, the data in the main memory 206 can be updated to be consistent with the new data in the cache 209. The server 200 also includes a non-volatile memory 212 suitable for embodying computer program instructions and data that are executed and/or processed by the processor 208. The memory 212 can be one or more of, for example, a semiconductor memory device, e.g., EPROM, EEPROM, and flash memory devices; magnetic disks, e.g., internal hard disks or removable disks; magneto-optical disks; and CD-ROM and DVD-ROM disks. Certain elements of the system shown in FIG. 2 can all be located on a single chip to form a system on a chip ("SOC"). For example, two or more of the CPU 208, cache 209, memory controller 210, memory 212, and memory 206 can be located on a SOC.

When running the software-based TCP/IP offload engine, TCP/IP packets can be received from the network 202, stripped of their header information, and then the data payload can be routed directly from a kernel space receive buffer 224 to a media decoder 212 (e.g., an audio decoder or a video decoder), without being passed up through a traditional TCP/IP stack and copied into user space application buffers 229 before being routed to the decoder. After receiving the data, the decoder 212 then decodes the data from the payload of the TCP/IP packet and routes the decoded data though a direct memory access ("DMA") circuitry 214 to a playback processor 216 for display on a display device 218. So that successful reception of packets can be acknowledged to the server 205, received data packets are processed by the kernel space software-based TCP/IP offload engine ("cSTOE") 220 that maintains state machines and logic required for sending acknowledgement ("ACK") packets back to the server 205. The cSTOE 220 processes the incoming packets and decides whether to forward payload data from the packets to the decoder 212 for playback, in which case the cSTOE sends out an ACK packet, or whether to discard the packet.

The network interface 204 can communicate with the memory 206 through a DMA 221, such that CPU resources need not be expended when receiving packets from the network 202 into a network driver engine 222 running on the client 200. The network driver 222 receives the packets and places them in the receive buffer 224, and the cSTOE 220 analyzes header data of the buffered packets to monitor data flow during the TCP/IP session. The cSTOE 220 sends ACK packets to a send buffer 226 that then routes the ACK packets through the network driver 222 and out to the network 202 through the network interface 204. A user application 228 performs command and control operations on the cSTOE 220 and also of the media decoder 212. Certain elements of the system shown in FIG. 2 can all be located on a single chip to form a system on a chip ("SOC"). For example, the CPU 208, memory controller 210, memory 206, and DMA circuitry 221 and 214 can all be located on a SOC.

Thus, as shown in FIG. 2, TCP/IP packets can be intercepted as they are admitted to the network layer before being passed to an application 228 in the user space, filtered and validated by the cSTOE 226. Packets that match the filter criteria, and therefore are valid, are directly fed into a processing engine 212 inside a SOC, and corresponding acknowledgement packets can be generated by the cSTOE 226 and transmitted back to the server 205, to keep the connections alive.

Thus, in the system of FIG. 2, packets are not copied to user space buffers but are fed directly to the decoder 212 for processing and playback though the playback processor 216. This saves CPU bandwidth, memory space, and memory bandwidth. As described in more detail below, the cSTOE 226 sends ACK packets based on pre-stored TCP/IP headers and performs simplified checksum computations, and reduces the latency of acknowledgement. As the control paths 230 and 232 show, the user application 228 intervenes only when setting up and tearing down the TCP/IP session with the server, when setting up the cSTOE to start/stop operation of the cSTOE, and to set up of the decoders to start or stop the decoding process on the media data. In this manner several processing steps that would otherwise consume CPU cycles in the data path are reduced. For example, and as described in more detail below, the acknowledgement of received packets back to the server can be simplified by using pre-stored headers, such that less data needs to be processed when sending and ACK packet; copying TCP/IP packets to user space can be eliminated; checksum validation of data can be completely eliminated in the TCP layer; and the received payload data can be fed directly from the receive buffer 224 to the decoder 212 without copying the data to intermediate memory locations.

Figure 3:
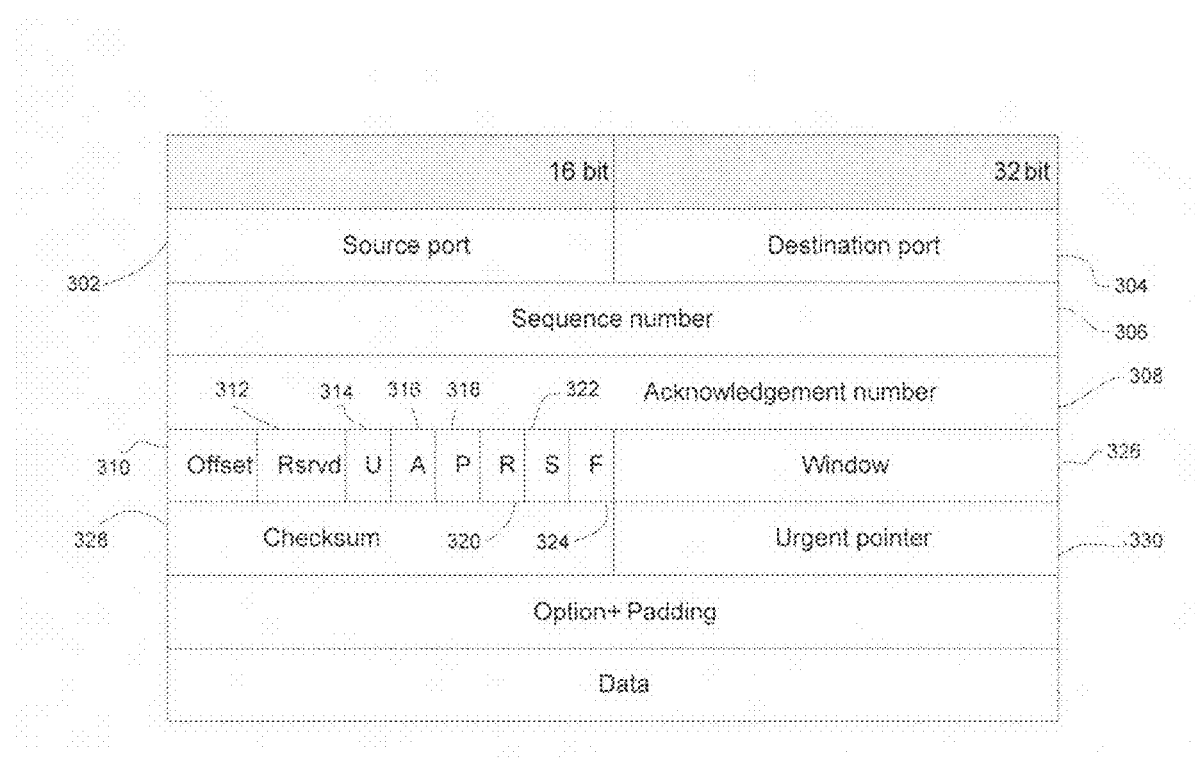
FIG. 3 is a block diagram of a TCP header template.

Several simplifications to the traditional TCP/IP protocol can be made to provide a simple cSTOE that can efficiently process the receiving side traffic. FIG. 3 shows the fields of a TCP packet 300, and the role of these fields in the cSTOE is described below. The source port field 302 indicates the address of the port from with the packet originated and is used in the cSTOE 220 for packet filtering. The destination port field 304 indicates the destination port or MAC address of the packet and can be ignored in the cSTOE 220 because the cSTOE can assume that packets received during a TCP/IP session that are otherwise valid have been sent to the correct destination port.

During normal operation after a TCP/IP session has been established between the client and the server, the sequence number field 306 contains the sequence number of the first data octet in this segment. However, when a synchronize ("SYN") packet is present to initiate a new connection and synchronize the sequence numbers between the server 202 and the client 200, the sequence number field 306 contains the initial sequence number ("ISN"), and the value of the first data octet is ISN+1. The cSTOE 220 compares the sequence numbers of received packets with the next expected sequence numbers to check if packets are out of order or have been dropped.

If the ACK control bit is set, the acknowledgement number field 308 contains the value of the next sequence number that the sender of the segment is expecting to receive. Once a connection is established, this value is always sent. In the cSTOE operation, for packets transmitted from the client 200 to the server 202 this number is recomputed with the transmission of each ACK packet. The data offset field 310 contains the number of 32-bit words in the TCP header, which indicates where the data begins. The TCP header (even one that includes options) generally has a length that is an integral number of 32 bits. When using the cSTOE 220, the value of the offset field value can bet set to a constant value (e.g., 8), which gives a 32 byte TCP Header. The reserved field 312 is reserved for future use and is set to zero.

Various control bits can be set. For example, a valid urgent control bit 314 indicates that an urgent pointer field is significant. This bit is not used when operating the cSTOE. A valid acknowledgement control bit 316 indicates that an acknowledgement field is significant. This field is always set when operating the cSTOE 220. A valid push control bit 318 indicates that the session is operating in push mode, but this bit is not used when operating the cSTOE. A valid reset ("RST") control bit 320 indicates that the TCP/IP connection must be reset and is used by the cSTOE to terminate a session between the client and server. A valid synchronize ("SYN") bit 322 is used to indicate that sequence numbers of packets must be synchronized between the server and the client. A valid finish ("FIN") control bit 324 indicates that no more data is to be sent from the sender. Thus, the cSTOE uses only the acknowledgement bit 316, the synchronize bit 322, the finish bit 324, and the reset bit 320, while other control bits of the TCP header can be ignored.

When using the cSTOE 220 on the client side, there is no need for sliding window adjustment, because data is consumed directly from the receive buffer 224 by the playback engine 216, so the window can have a fixed size (e.g., 16 kilobytes), and the window field 326 contains this constant value. Flow control is achieved by delaying the acknowledgements of received packets, if the client-side docoder buffers are full.

The checksum field 328 is the 16 bit one's complement of the one's complement sum of all 16-bit words in the header and text of a packet. If a segment contains an odd number of header and text octets to be check-summed, the last octet is padded on the right with zeros to form a 16-bit word for checksum purposes. The pad is not transmitted as part of the segment. While computing the checksum, the checksum field itself is replaced with zeros. The received packets need not be check-summed in the cSTOE 220 because of the Ethernet cyclic redundancy check ("CRC") validity that is performed at the Ethernet datalink layer.

The urgent pointer field 330 communicates the current value of the urgent pointer as a positive offset from the sequence number in this segment. The urgent pointer points to the sequence number of the octet following the urgent data. This field can only be interpreted in segments for which the urgent control bit 314 has been set, and is unused in the cSTOE. The options field 332 may be transmitted at the end of the TCP header and always have a length that is a multiple of 8 bits. The cSTOE 220 does not support TCP options on the client side, and therefore this field is ignored by the cSTOE. The data field contains the digital media compressed payload that is to be fed directly to the media playback engine 216.

To set up the cSTOE 220 so that digital media data can be routed directly to the payback engine, a TCP/IP connection is established between the client 200 and the server 205. When the TCP/IP session is opened the cSTOE is instructed to acquire and store the template received when a SYN packet is sent and an SYN-ACK packet is received. This SYN-ACK packet contains relevant information to provide the cSTOE 220 with header information to construct valid outgoing ACK packets and to create a template for outgoing ACK packets, so that processing resources can be conserved during the exchange of packets. A helper socket can be opened during this initialization phase between a TCP/IP stack and the user application 228 to manage the establishment of routing connections and other handshaking operations during set up of the connection.

After the TCP/IP connection has been established between the server 205 and the client 200, the cSTOE operation takes over the processing of received packets, so the client side helper socket is blocked from communication and may be closed. Thereafter, the cSTOE 220 receives packets and forwards the packets to the decoders 212 until the application 228 sends a stop signal. When the application 228 sends a stop signal, the cSTOE goes into reset state and sends a RST signal to the server 205. This takes both the server and client back to the closed state immediately. However, if trailing packets are transmitted by the server or client protocol stacks, they are handled by the normal protocol TCP/IP stack (i.e., without aid of the cSTOE), until the server- and client side FIN timers expire.

To initialize the TCP/IP session between the client 200 and the server 205, a three-way handshaking process is used. Before the client attempts to connect to the server, the server first binds to a port to open it up for connections, which is known as a passive open of the session. Once the passive open is established, the client may initiate an active open through the handshaking process. The active open is performed by sending a SYN packet containing a random initial sequence number from the client to the server. For purposes of discussion, the value of the sequence number can be called "x." The server receives the packet, records the sequence number in the received packet, and replies with an acknowledgment and synchronization (SYN-ACK) packet that contains a synchronization number and an acknowledgment number in the TCP segment header of the packet. The value of the acknowledgement number of the packet sent from the server is the next sequence number that the server expects to receive from the server, i.e., x+1. The server also initiates a return session by including as the sequence number of the packet its own initial sequence number value that may be called "y." Finally, the client sends an ACK packet back to the server, which contains a sequence number value equal to x+1 and an acknowledgment number value equal to y+1. At this point, both the client and server have received an acknowledgement of the connection, and the session is open to transfer data.

The system 200 can handle SYN handling and setting up the TCP/IP session without the cSTOE 220 with the use of a helper socket between the TCP/IP stack in kernel space and the user application in the user space. The socket, after it goes into a connected state, can indicate to the cSTOE 220 to take over communications, and then the client 200 may close the socket at the application layer, while the cSTOE 220 maintains the TCP/IP connection with the server 205.

After establishment of the TCP/IP connection, the server 205 sends packetized data to the client 200. The client's last acknowledged ACK-SEQ number is compared with the SEQ number of the packet that is ready to be sent out from the server, and if the client ACK number does not match the SEQ number of the next packet that is to be transmitted then retransmission of the previous packet is performed. This is all part of normal TCP/IP protocol.

On the client 200, the cSTOE 220 keeps track of next expected SEQ number from the server 205, by adding the length of the last received packet to the last received SEQ number. It then constructs an ACK packet for the received packet if the SEQ number of the received packet matches the SEQ number of the next expected packet. If a match does not exist, the client 200 must send an ACK packet acknowledging the most recent valid received packet. Under normal operation, if the server receives three such identical ACK packets for the same sequence number, the server goes into a fast retransmit mode and re-sends the missing packet.

The ACK packet is a minimum length 66-byte TCP packet. It has a 14-byte Ethernet header, a 20 byte IP header, and a 32 byte TCP header. Because the length of the header is fixed at 66 bytes, and the values of the port fields 302 and 304, the window size and the offset are all fixed, the only variable quantities in the ACK packet are the TCP control bits used by the cSTOE, i.e., the SYN control bit 322, the FIN control bit 324, and the RST control bit 320, and the acknowledgement number 308, the sequence number 306, and the checksum value 328.

Therefore, a precomputed ACK packet template based on the first received packet from the server can be stored in memory and used to prepare ACK packets very efficiently to send out. By using a prestored template, CPU resources are reduced when preparing ACK packets to send to the server. An initial packet template can be created by a simple interchange of the Ethernet destination port value of the received packet and the source ports value in the template, a similar interchange between the IP destination and source port values and the TCP destination and source port values, and by setting specific fields in the IP and TCP header fields. For example, in the Ethernet header portion of the template, the Ethernet destination MAC address of the template can be filled in based on the source address value in the first packet received from the server. The Ethernet source MAC address in the template can be filled in from the destination address value in the first packet received from the server. The Ethernet type value in the template can be filled in based on the value of the Ethernet type used in the first received packet.

In the IP header portion of the template ACK packet, the following values can be used. The IP Type of Service ("TOS") value can be selected to give the network priority in data transmission; usually setting this value to zero will suffice. The IP ID value is set to zero=0 because this field is usually ignored when packets are not fragmented. The IP Frag_Offset value is set to zero=0 to indicate that packets are not fragmented. The IP time to live ("TTL"), which is used to determined the number of hops/links over which the packet may be routed, is set to 32, which is a relatively a small number to make sure packets do not travel through too many hops. The IP Version value is set to 4, which is the current version of the Internet protocol. The IP Header Length ("HeaderLen"), which is the number of 32-bit words forming the header, is set to 5. The IP Total Length ("IP TotalLen") value is set to 52, which is the sum of the IP header length (20 bytes) and the TCP header length (32 bytes). The IP Protocol value is set equal to 6, which specifies TCP. The IP Source address value is filled in from the destination address of the received packet, and the IP Destination Address is filled in from the source of the received packet. The IP header checksum value is based on a checksum calculation that can be performed using known methods. For a four byte aligned header, as may be used with the cSTOE, the checksum algorithm can be simplified to a known fast checksum function, ip_fast_csum.

In the TCP header of the template ACK packet, the TCP SOURCE PORT value is filled in based on the destination port value from the received packet. The TCP DESTINATION PORT value in the template can be filled in based on the source port value of the received packet. The ACK bit is set to 1, and the FIN, SYN, and RST bits are initially set to zero. The acknowledgement number and the sequence number are initially set to zero in the template packet, and the window size is set to a constant value of 16 kilobytes. The data offset value is set to 8, which specifies the header size as 32 bytes, and the values of all other fields are set to zero. An initial checksum value can be calculated based on the values of fields in the TCP header that do not change, by setting the acknowledgement number 308 and sequence number 306 fields to zero This initial checksum value for the TCP header then can be stored in the header template and re-used to perform differential checksumming on later ACK packets by adding the initial checksum value to checksum values that are calculated based on analysis of the header information that can vary in the TCP header (i.e., the acknowledgement number 308 and sequence number 306). In the normal operation of a client that is receiving data for playback, the sequence number field also is a constant value because traffic flows only in one direction, i.e., from the server 205 to the client 200. This means the calculation of the checksum for an acknowledgement packet is straightforward and can be determined by adding the seq_num and the ack_seq_num to the ones complement of the prestored template checksum and then taking the ones complement of this number and substituting the resulting value into the current packet's TCP header.

In the header of an ACK packet to be returned to the server 205 from the client 200, several fields (e.g., the sequence number field, the acknowledgement number field, and the FIN, SYN, and RST control bits) must be determined at the time the packet is prepared and then inserted into the template before sending the packet. If the most recently received packet is a valid packet (i.e., it was the expected packet), then the value of the ACK packet's acknowledgment number is equal to the value of the previously-received SEQ packet's sequence number plus the length of the received packet. If the last received packet is an invalid packet then the value of the ACK packet's acknowledgement number is equal to the value of the acknowledgement number of the last ACK packet that was sent from the client 200 to the server 205. The sequence number of the ACK packet is set equal to the acknowledgement number of the last valid received packet. Values of the SYN, RST, and FIN control bits are set as appropriate to indicate that the packets need to be synchronized between the client and the server, that the connection needs to be reset, and that no more data should be sent from the server to the client.

To calculate the value of the checksum field for the ACK packet, the checksum analysis is performed as described above.

After the TCP/IP header of the ACK packet has been created, the cSTOE 220 forwards the packet into a send buffer 226 and instructs the Ethernet DMA 221 to grab the packet from the send buffer 226 and send the packet to the server 205. Then the information pertaining to variable portions of the header are flushed from a CPU-cache, and immediately sent out using the output network hardware.

When an expected packet is not received, the cSTOE 220 can discard all the succeeding packets received from the network 202 until the expected packet arrives. This methodology works with latencies acceptable in the video buffer model and results in a jitter is about 200 ms of less, which can be tolerated. The streaming video server tends to speed up after a retransmission, as it is pacing to a program clock reference ("PCR") and naturally will send data faster than normal after a retransmission. This has the automatic effect of reducing the jitter observed at the video decoder.

After transmission of a stream of media data, the TCP/IP session can be torn down by sending a TCP packet with a valid reset ("RST") control bit from the client 200 to the server 205. This usually breaks the connection to the server, and the server hangs up. The client then uninstalls the protocol handler to the cSTOE 220 for this session. All trailing FIN transactions are handled by the normal protocol stack with FIN timeouts. The actual shutdown of a TCP/IP session is a complicated process, and the normal operating system protocol stack can handle the graceful shutdown and timeout of connections, at the end of a session.

An advantage of the techniques described herein is high-performance, low-CPU-usage for TCP/IP protocol implementation sufficient to handle high bandwidth video reception. Because necessary CPU processing power is relatively low, inexpensive processors can be used to implement the reception and display of media data delivered through TCP/IP networks. In particular, a 300 MHz class MIPS processor can be used to receive and route multiple, high-bandwidth HDTV streams simultaneously to playback processors for display on display devices.

The cSTOE 220 is capable of operating over any network interface, including wired Ethernet, wireless, and emerging new standards, such as for example, Ethernet over cable (MoCA). The cSTOE works side by side with the standard TCP/IP protocol stack, and allows the standard protocol stack to process non-video/audio data seamlessly. Therefore, all applications that were designed to run over IP, UDP, or TCP type network protocols work seamlessly with the cSTOE 220.

The cSTOE provides lower latency and is well suited for video applications. Video streams delivered at 20 Mbps transmission rates require handling 1-2 Ethernet packets per millisecond, and transmission through a traditional TCP/IP protocol stack increases latency. The cSTOE 220 reduces latency by acknowledging packets immediately. In addition, the cSTOE can signal missing packets proactively, by sending three duplicate ACK packets for the previous received packet when an expected packet is not received. This puts most servers in fast retransmit mode.

The specific implementation of the cSTOE 220, which triggers the fast retransmission of packets by the server 205, tends to recover and reduce jitter during retransmission of packets. This is because the client 200 will send ACK packets more frequently until its buffers are full. This forces the server to send data more frequently, speeding up communication. Thus, even if a 100 ms delay occurs when receiving a retransmitted missing packet, the subsequent packets arrive faster, and the delay at the decoder 212, after buffering of 1-2 megabytes in the receive buffer 224 may be negligible.

Under certain modes, where the cSTOE video client provides flow control based on the video decoder System Time Clock ("STC")-method and its buffer fill model, the buffer depth can be monitored, and the server can be signaled with ACK packets paced out to just keep the amount of data in the video FIFO and the received socket buffer at a constant value. This may be the case when the video decoder is in playback operation. In this case, the server 205 does not need to pace to a PCR, and it should burst as fast as permitted by the client's sending of ACK packets. In this case, even a web server or an FTP server can be effectively used as the server side, which provides a business and operational advantage. This is the operation of the client-side pull model for video streaming over TCP/IP.

The cSTOE 220 also can be quite useful when used with a wireless network, where the network packet loss rate is relatively high and error recovery is critical. The TCP/IP based protocols are ideal for the wireless medium, and the cSTOE 220 allows the client to meet or exceed necessary criteria for wireless video delivery.

Use of the cSTOE 220 also results in a lower memory footprint as well as a lower memory bandwidth requirement. The packet copying from kernel space to user space not only consumes CPU bandwidth, but it also uses additional memory, as well as memory bandwidth, and both of these are conserved by using the cSTOE methodology.

Basic requirements for implementing the cSTOE are receipt of data over a connection-oriented protocol (e.g., TCP/IP) and a software hook and filter for implementing the cSTOE. All modern operating system provide this capability. cSTOE processing is done at the boundary between the MAC layer and the IP layer. Only the packets that meet the filter criteria are processed by the cSTOE. No modifications need to be done on the received payload, and the payload can be directly fed to the playback hardware engine as a list of multiple descriptors. ACK packets are generated close to the network layer, and are transmitted immediately from a position one step away from the network interface, which results in fast turnaround time and higher data throughput, thus avoiding the latency of processing that often slows down TCP/IP. For simplification, no checksums need to be computed on data payloads because Ethernet hardware/wireless hardware takes care of this. A simplified state machine for processing ACKs is provided, and a simplified algorithm of dropping all packets out of sequence works well in practice, giving sub-200 ms latencies that are tolerable for video playback.

Variations of the cSTOE method can be used for any type of connection-oriented delivery of any type of data over a network medium. For example, the cSTOE 220 can be used to speed up data downloads or to accelerate access to a file server or to a web-server. Additionally, the cSTOE method can be used when the CPU does not need to consume received data immediately, e.g., where the data can be forwarded to hardware for storage (e.g., on a disk), where the data is consumed by other hardware devices (e.g., co-processors and codecs), to Ethernet ports, and to other network adapters.

This cSTOE method can be used for video reception over TCP/IP. The cSTOE can be adapted for high speed data transfer over TCP/IP to accelerate protocols such as HTTP, FTP etc. Therefore, it can be adopted in PC technology as well. Another instance in which data transfer over TCP becomes important is in NAS (Network attached storage) with large hard-disks. The cSTOE can be adopted to networked, DVD receivers, and in various recording devices which have a need to receive large amount of data for storage.

Although the focus of the current invention is on the Digital Video Settop, minor variations of the system and method can be used for A/V recording devices such as Network attached storage devices, PCs, DVD recorders, and other streaming media renderers.

Implementations of the various techniques described herein may be implemented in digital electronic circuitry, or in computer hardware, firmware, software, or in combinations of them.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. The processor and the memory may be supplemented by, or incorporated in special purpose logic circuitry.

While certain features of the described implementations have been illustrated as described herein, modifications, substitutions, and changes can be made.

What is claimed is:

1. A method of receiving data transferred from a first computing device to a second computing device through a network, the transfer of data adhering to a packet-based network protocol the method comprising:
   establishing a connection between the first computing device and the second computing device for a session according to the network protocol;
   receiving a data packet from the first computing device at the second computing device, wherein the data packet includes payload data and a header;
   defining, via a central processing unit of the second computing device, a packet header template for acknowledging the receipt of the data packet, the template having a plurality of static fields filled with static values and variable fields that can acquire packet-dependent values;
   storing the header template in a memory location of a memory device of the second computing device;
   updating, via the central processing unit of the second computing device, the packet-dependent values of the variable fields of the template stored in the memory device; and
   sending an ACK packet that includes a copy of the updated packet header from the first computing device to the second computing device to acknowledge the receipt of the packet.

2. The method of claim 1, wherein the network is a wireless network.

3. The method of claim 1, wherein the protocol comprises TCP/IP and wherein a variable field is adapted for carrying the value of a sequence number identifying the ACK packet within a sequence of a plurality of ACK packets sent from the first computing device to the second computing during the session.

4. The method of claim 1, wherein the protocol comprises TCP/IP and wherein a variable field is adapted for carrying the value of an acknowledgement number corresponding to the value of a sequence number of the received data packet.

5. The method of claim 1, wherein the protocol comprises TCP/IP and wherein the static fields include a source field, a destination field, and a window size field, wherein the variable fields include a checksum field, and the method further comprising:
   performing, via the central processing unit of the second computing device, a checksum analysis on the data packet and adding the result of the checksum analysis to the checksum field.

6. The method of claim 1, wherein the protocol comprises TCP/IP and further comprising writing updated packet-dependent values from a CPU cache to the template stored in the memory, wherein at least one static value used in ACK packet header is not written from the template to the CPU cache and back to the memory device.

7. The method of claim 1, further comprising routing the payload data to a video display device.

8. A method of receiving data transferred from a first computing device to a second computing device through a network, the transfer of data adhering to a TCP/IP protocol, the method comprising:
   establishing a connection between the first computing device and the second computing device for a session according to the TCP/IP protocol;
   receiving a data packet from the first computing device at the second computing device, wherein the data packet includes payload data and a header;
   defining, via a central processing unit of the second computing device, a packet header template for acknowledging the receipt of the data packet, the template having a plurality of static fields filled with static values and variable fields that can acquire packet-dependent values;
   storing the header template in a memory location of the second computing device;
   assigning, via the central processing unit of the second computing device, a sequence number value with a central processing unit of the second computing device to the sequence number field of the header template;
   assigning, via the central processing unit of the second computing device, an acknowledgement number value with the central processing unit to the acknowledgement number field of the header template; and then
   sending an ACK packet that includes a copy of the packet header template, including the assigned acknowledgement and sequence numbers, from the second computing device to the first computing device to acknowledge the receipt of the packet.

9. The method of claim 8, wherein when the data packet corresponds to an expected packet, the acknowledgment number value is equal to a value of data packet's sequence number plus a length of the received data packet.

10. The method of claim 8, wherein when the data packet corresponds to an unexpected packet, the acknowledgment number value is equal to the value of an acknowledgement number of an ACK packet that was previously-sent from the second computing device to the first computing device.

11. The method of claim 8, wherein the sequence number value is equal to an acknowledgement number value of the received data packet.

12. The method of claim 8, wherein the network is a wireless network.

13. The method of claim 8, wherein the first computing device is a settop gateway and the second computing device is a settop client, and wherein both computing devices are located within the same building.

14. A playback computing-device for receiving data transferred from a streaming computing through a network, the transfer of data adhering to a TCP/IP protocol, the playback computing-device comprising:
- a central processing unit;
- a random access memory;
- a network interface device; and
- a memory for storing computer-executable instructions, that when executed:
  - cause the network interface device to establish a connection with the playback computing device for a session according to the TCP/IP protocol;
  - cause the central processing unit to define a packet header template and store the header template in the random access memory, the template having a plurality of static fields filled with static values and variable fields that can acquire packet-dependent values, wherein the variable fields include a sequence number field and an acknowledgement number;
  - cause the central processing unit to assign sequence number values to the sequence number fields of the header template for each of the plurality of packets;
  - cause the central processing unit to assign acknowledgement number values to the acknowledgement number fields of the header template for each of the plurality of packets; and
  - cause the network interface device to send ACK packets to the streaming computing device to acknowledge the receipt of a data packets, wherein the ACK packets include a copy of the packet header template, including the assigned acknowledgement and sequence numbers.

15. The playback computing-device of claim 14, wherein the network is a wireless network.

16. The playback computing-device of claim 14, wherein the streaming computing device is a settop gateway and the playback computing device is a settop client, and wherein both computing devices are located within the same building.

17. The playback computing-device of claim 14, further comprising a buffer, and wherein the memory further comprises computer-executable instructions that when executed cause the playback computing device to:
- store data packets received from the streaming computing device in the buffer;
- determine whether a received data packet is an expected data packet; and
- when the received data packet is an expected data packet to send the ACK packet with an acknowledgment number value that is equal to a value of received data packet's sequence number plus a length of the received data packet.

18. The playback computing-device of claim 14, further comprising a buffer, and wherein the memory further comprises computer-executable instructions that when executed cause the playback computing device to:
- store data packets received from the streaming computing device in the buffer;
- determine whether a received data packet is an expected data packet; and
- when the received data packet is not an expected data packet to send an ACK packet having an acknowledgment number value that is equal to the value of an acknowledgement number value of an ACK packet that was previously-sent to the streaming computing device.

19. The playback computing-device of claim 14, wherein the sequence number values are equal to an acknowledgement number value of data packets received from the streaming computing device.

20. The playback computing-device of claim 14, wherein the central processing unit, the random access memory, the memory, and the network interface device are located within a system on a chip.

* * * * *